(12) United States Patent
Matsunaga

(10) Patent No.: US 8,416,312 B2
(45) Date of Patent: Apr. 9, 2013

(54) IMAGE SELECTION DEVICE AND METHOD FOR SELECTING IMAGE

(75) Inventor: Kazuhisa Matsunaga, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 300 days.

(21) Appl. No.: 12/749,667

(22) Filed: Mar. 30, 2010

(65) Prior Publication Data

US 2010/0245614 A1    Sep. 30, 2010

(30) Foreign Application Priority Data

Mar. 31, 2009    (JP) ................................ P2009-086197

(51) Int. Cl.
*H04N 5/228* (2006.01)
*H04N 5/76* (2006.01)

(52) U.S. Cl.
USPC ....................... 348/222.1; 348/231.3; 382/117

(58) Field of Classification Search ............... 348/222.1, 348/231.2, 231.3, 78
See application file for complete search history.

(56) References Cited

U.S. PATENT DOCUMENTS

| | | | |
|---|---|---|---|
| 2007/0201724 A1 | 8/2007 | Steinberg et al. | |
| 2008/0068466 A1 | 3/2008 | Tamaru et al. | |
| 2008/0252745 A1* | 10/2008 | Nakamura | ................. 348/222.1 |
| 2008/0273765 A1 | 11/2008 | Tsujimura | |
| 2008/0285791 A1 | 11/2008 | Suzuki et al. | |
| 2008/0292299 A1 | 11/2008 | Kretz et al. | |
| 2009/0074234 A1 | 3/2009 | Yen | |
| 2009/0110243 A1 | 4/2009 | Uchiyama | |
| 2009/0135291 A1* | 5/2009 | Sugimoto | ..................... 348/347 |
| 2009/0251549 A1* | 10/2009 | Meguro et al. | ............. 348/208.4 |
| 2010/0189358 A1 | 7/2010 | Kaneda et al. | |
| 2011/0080504 A1* | 4/2011 | Akahori | ..................... 348/240.2 |
| 2011/0103785 A1* | 5/2011 | Kim et al. | ..................... 396/153 |
| 2012/0002849 A1* | 1/2012 | Tokuse | ......................... 382/118 |

FOREIGN PATENT DOCUMENTS

| | | |
|---|---|---|
| EP | 1921498 A2 | 5/2008 |
| EP | 2053843 A2 | 4/2009 |
| JP | 2004-046591 A | 2/2004 |
| JP | 2005-039365 A | 2/2005 |
| JP | 2006-211128 A | 8/2006 |
| JP | 2007-088594 | 4/2007 |

(Continued)

OTHER PUBLICATIONS

Extended European Search Report dated Jun. 9, 2010 (in English) issued in counterpart European Application No. 10157447.3.

(Continued)

*Primary Examiner* — Hung Lam
(74) *Attorney, Agent, or Firm* — Holtz, Holtz, Goodman & Chick, P.C.

(57) ABSTRACT

An image selection device including: a reception unit that receives a plurality of captured images obtained by rapid shooting one or more people as subjects; a face detection unit that detects human faces included in the captured images received by the reception unit; an eye detection unit that detects eyes in the human faces detected by the face detection unit; a blink detection unit that detects blink degrees of each of the eyes detected by the eye detection unit; an estimation unit that estimates statuses of the human faces based on the blink degrees detected by the blink detection unit; and a selecting unit that selects at least one of the captured images to be recorded on a recording medium from among the captured images received by the reception unit, based on the statuses of the human faces estimated by the estimation unit.

19 Claims, 7 Drawing Sheets

FOREIGN PATENT DOCUMENTS

| | | |
|---|---|---|
| JP | 2008-078712 A | 4/2008 |
| JP | 2008-205838 A | 9/2008 |
| JP | 2008-310775 A | 12/2008 |
| WO | WO 2007/097777 A1 | 8/2007 |

OTHER PUBLICATIONS

Japanese Office Action dated Jan. 11, 2011 (and English translation thereof) in counterpart Japanese Application No. 2009-086197.

* cited by examiner

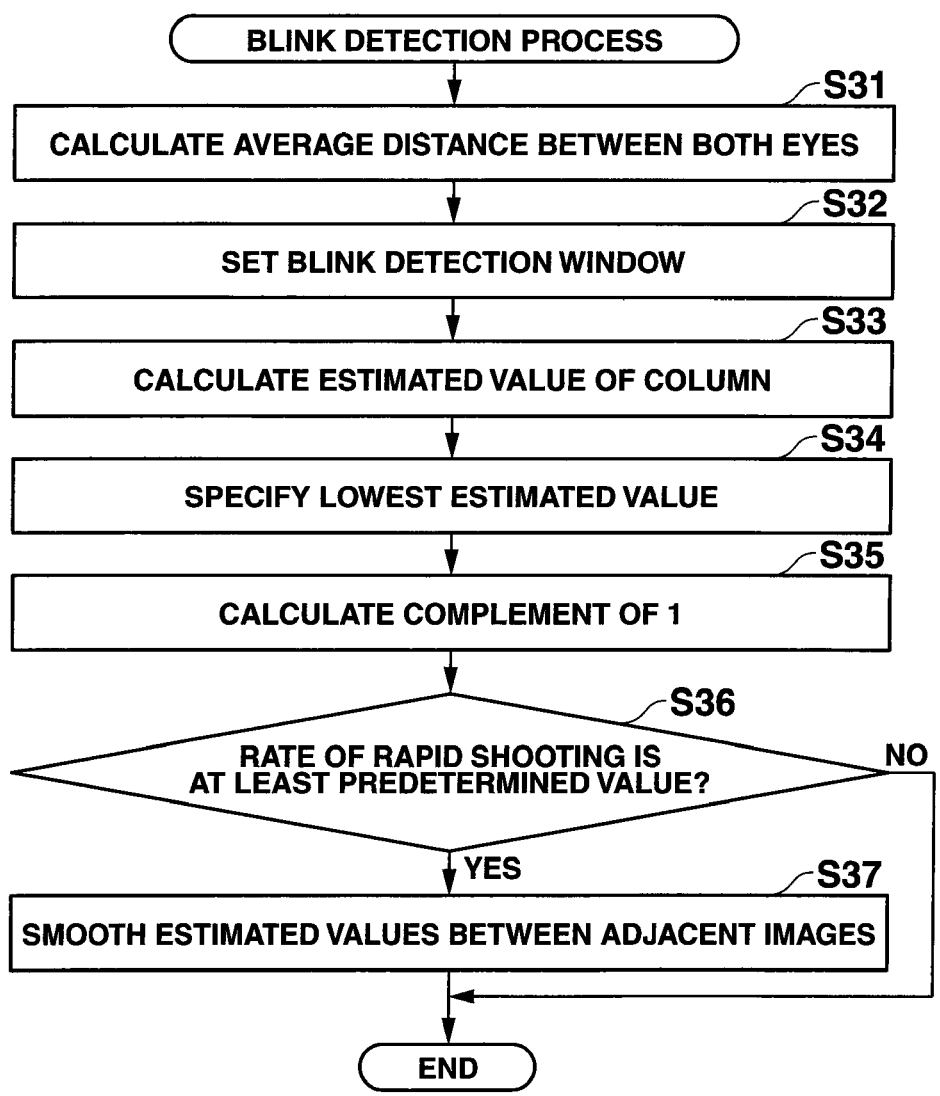

De: DISTANCE BETWEEN BOTH EYES
Wratio: COEFFICIENT FOR SETTING BLINK DETECTION WINDOW

IMAGE SELECTION DEVICE AND METHOD FOR SELECTING IMAGE

CROSS-REFERENCE TO THE RELATED APPLICATION(S)

The present application is based upon and claims priority from prior Japanese Patent Application No. 2009-086197, filed on Mar. 31, 2009, the entire contents of which are incorporated herein by reference.

BACKGROUND

1. Field

The present invention relates to an image selection device and a method for selecting an image from a plurality of images.

2. Description of the Related Art

Conventionally, there is known a digital camera having a function of rapid shooting and generating a plurality of pieces of image data for each of consecutive images. Recently, with increase of the number of images capable to be taken by the rapid shooting function, the operation of selection which should be made by a user himself/herself has been more complicated. As a solution to such complication, there has been known an image processing system to select a group photo where all of the people in the group are opening their eyes. An example of such system is disclosed in JP-A-2007-088594.

However, when a group photo is selected only based on determination as to whether all people in the group are opening their eyes or not, there may be no photo that can be selected.

SUMMARY

One of objects of the present invention is to provide an image selection device and a method for selecting an image from a plurality of images properly, simply and easily.

According to a first aspect of the present invention, there is provided an image selection device including: a reception unit that receives a plurality of captured images obtained by rapid shooting one or more people as subjects; a face detection unit that detects human faces included in the captured images received by the reception unit; an eye detection unit that detects eyes in the human faces detected by the face detection unit; a blink detection unit that detects blink degrees of each of the eyes detected by the eye detection unit; an estimation unit that estimates statuses of the human faces based on the blink degrees detected by the blink detection unit; and a selecting unit that selects at least one of the captured images to be recorded on a recording medium from among the captured images received by the reception unit, based on the statuses of the human faces estimated by the estimation unit.

According to a second aspect of the present invention, there is provided a method for selecting an image, the method including: receiving a plurality of captured images obtained by rapid shooting one or more people as subjects; performing a face detection process for detecting human faces included in the captured images; performing an eyes detection process for detecting eyes in the human faces detected by the face detection process; performing a blink detection process for detecting blink degrees of each of the eyes detected by the eye detection process; estimating statuses of the human faces based on the blink degrees detected by the blink detection process; and selecting at least one of the captured images to be recorded on a recording medium from among the captured images, based on the statuses of the human faces being estimated.

According to a third aspect of the present invention, there is provided a computer readable medium storing a software program that causes a computer to perform image processing for selecting an image, the image processing including: receiving a plurality of captured images obtained by rapid shooting one or more people as subjects; performing a face detection process for detecting human faces included in the captured images; performing an eyes detection process for detecting eyes in the human faces detected by the face detection process; performing a blink detection process for detecting blink degrees of each of the eyes detected by the eye detection process; estimating statuses of the human faces based on the blink degrees detected by the blink detection process; and selecting at least one of the captured images to be recorded on a recording medium from among the captured images, based on the statuses of the human faces being estimated.

BRIEF DESCRIPTION OF THE DRAWINGS

A general configuration that implements the various features of the present invention will be described with reference to the drawings. The drawings and the associated descriptions are provided to illustrate embodiments of the invention and not to limit the scope of the invention.

FIG. 4 is a flow chart showing an example of operation relating to a blink detection process in the image selection process of FIG. 2.

DETAILED DESCRIPTION

Figure 1:
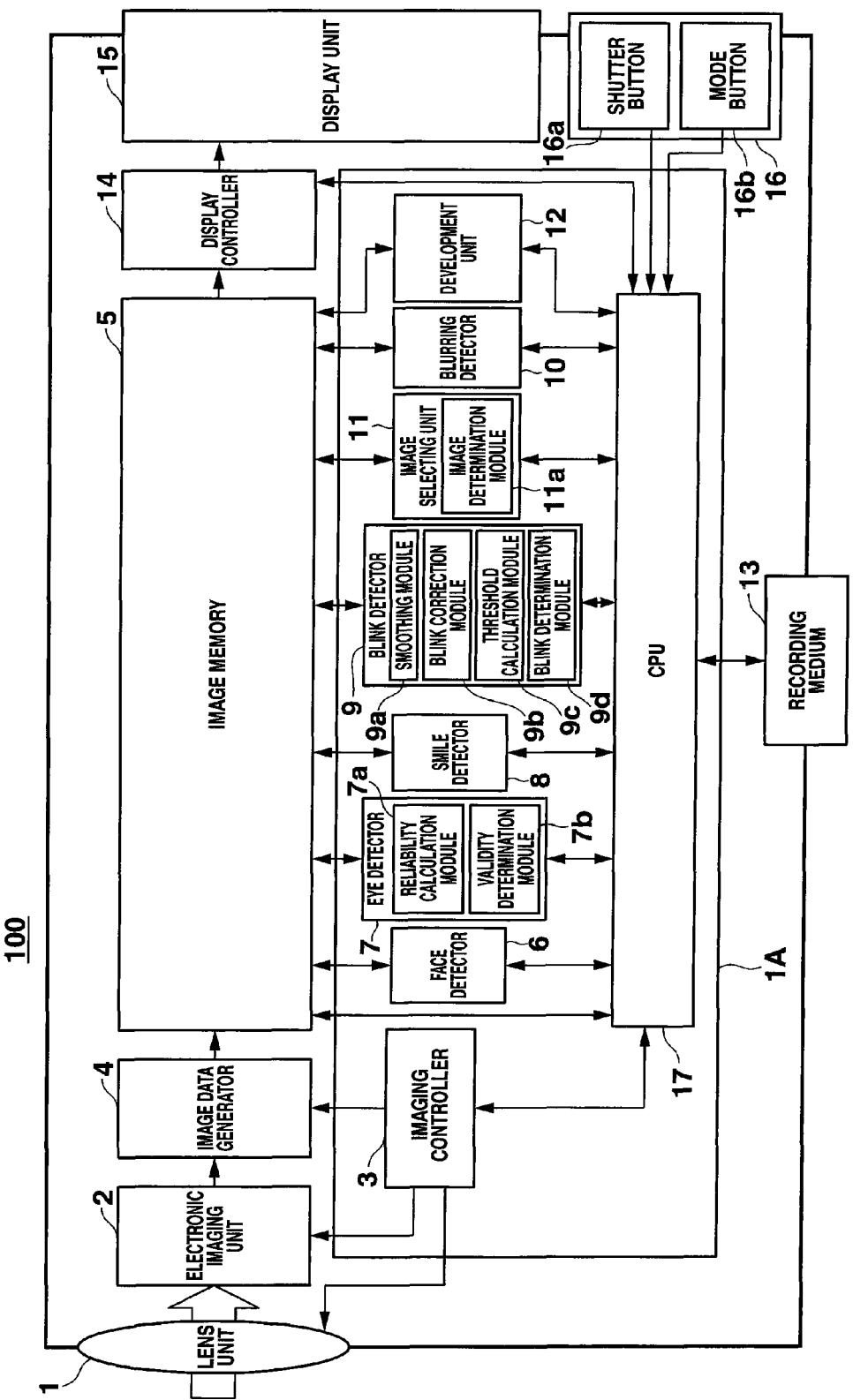
FIG. 1 is a block diagram showing a schematic configuration of an imaging apparatus according to an embodiment the invention.

An embodiment according to the present invention will be described in detail with reference to the accompanying drawings. The scope of the claimed invention should not be limited to the examples illustrated in the drawings and those described below.

FIG. 1 is a block diagram showing a schematic configuration of an imaging apparatus 100 according to an embodiment to which the invention is applied.

The imaging apparatus 100 according to this embodiment detects human faces from a plurality of image frames generated by rapid shooting, calculates estimated blink values of eyes of the detected human faces, estimates the statuses of the human faces based on the calculated estimated blink values, and selects one selected image to be recorded on a recording medium 13 from the plurality of image frames based on the estimated statuses of the human faces.

As shown in FIG. 1, the imaging apparatus 100 has a lens unit 1, an electronic imaging unit 2, an imaging controller 3, an image data generator 4, an image memory 5, a face detector 6, an eye detector 7, a smile detector 8, a blink detector 9, a blurring detector 10, an image selecting unit 11, a development unit 12, a recording medium 13, a display controller 14, a display unit 15, a user interface 16, and a processor (CPU) 17.

The imaging controller 3, the face detector 6, the eye detector 7, the smile detector 8, the blink detector 9, the blurring detector 10, the image selecting unit 11, the development unit 12 and the CPU 17 are, for example, designed as a custom LSI 1A.

The lens unit 1 has a plurality of lenses, including a zoom lens and a focus lens.

Although not shown, the lens unit 1 may have a zoom lens actuator for moving the zoom lens in its optical axis direction, a focus lens actuator for moving the focus lens in its optical axis direction.

The electronic imaging unit 2, for example, has an image sensor such as a CCD (Charge Coupled Device) or a CMOS (Complementary Metal-Oxide Semiconductor), by which an optical image passing through various lenses of the lens unit 1 is converted into a two-dimensional image signal.

Although not shown, the imaging controller 3 has a timing generator and a driver. The imaging controller 3 drives the electronic imaging unit 2 for a scan by use of the timing generator and the driver. Thus, an optical image is converted into a two-dimensional image signal with a predetermined period of time by the electronic imaging unit 2. The imaging controller 3 reads out image frames from an imaging area of the electronic imaging unit 2 screen by screen. The read image frames are outputted to the image data generator 4.

The imaging controller 3 controls adjustment of conditions for imaging subjects, including AF (Automatic Focus), AE (Automatic Exposure) and AWB (Automatic White Balance).

The imaging lens unit 1, the electronic imaging unit 2 and the imaging controller 3 configured thus serve as an imaging unit to continuously image subjects at a predetermined frame rate (for example, 3 fps or 10 fps) and generate and acquire a plurality of (for example, 20) image frames one after another.

The image data generator 4 performs suitable gain adjustment for each color component of R, G and B on analog value signals of image frames transmitted from the electronic imaging unit 2. Then, the image data generator 4 samples and holds the analog value signals in a sample and hold circuit (not shown), and converts them into digital data in an A/D converter (not shown) to generate RAW image data. In addition, the image data generator 4 performs processing to reduce luminance signals of the RAW image data both horizontally and vertically at a predetermined rate to generate low-resolution reduced-luminance image data.

The RAW image data and the reduced-luminance image data are DMA-transferred to the image memory 5 through a not-shown DMA controller. The image memory 5 serves as a buffer memory.

The image memory 5, for example, is provided with a DRAM or the like, and temporarily stores data processed by the face detector 6, the eye detector 7, the smile detector 8, the blink detector 9, the blurring detector 10, the image selecting unit 11 and the CPU 17.

The face detector 6 detects human faces from each reduced-luminance image data of a plurality of image frames, using a predetermined face detection method. Specifically, the face detector 6 detects face image regions from each image frame based on the reduced-luminance image data temporarily stored in the image memory 5, and generates image information in the detected face image regions as face frame information. The face detection process belongs to a known technique, and detailed description thereof will be therefore omitted herein.

Here, the face detector 6 serves as a face detection unit which detects human faces from a plurality of captured images.

For any image frame where no face is detected in the face detection process, face frame information is set in the image frame based on the coordinates of face image regions where faces have been detected in the closest one of image frames around the image frame where no face is detected.

That is, continuous shots are taken in extremely short time intervals. Therefore, if a human face is detected from one of image frames, the human face can be regarded as being present also in the other image frames around the image frame where the human face is detected. Face frame information is also set in the image frames where no face is detected, using the coordinates of a face image region of the image frame where the face is detected (for example, the coordinates of four corners of a rectangular frame).

The eye detector 7 detects eyes of human faces based on the face frame information of each image frame generated by the face detector 6. Specifically, the eye detector 7 detects left and right eyes of any person in each image frame based on the face frame information of each image frame, and calculates the coordinates of the center of each eye. The eye detection process belongs to a known technique, and detailed description thereof will be therefore omitted herein.

Here, the eye detector 7 serves as an eye detection unit that detects eyes from human faces detected by the face detector 6.

The eye detector 7 has a reliability calculation module 7a and a validity determination module 7b.

The reliability calculation module 7a serves as a reliability calculation unit, which calculates detection reliability as to the detection of eyes made by the eye detector 7. Specifically, the reliability calculation module 7a calculates detection reliability adjusted so that the reliability may be lowered, for example, if a face detection frame is improper or if a face turns sideways.

The validity determination module 7b serves as a validity determination unit, which determines the validity of each face from which eyes have been detected, based on whether the detection reliability of the eyes calculated by the reliability calculation module 7a is higher than a predetermined threshold or not. When the detection reliability is not higher than the predetermined threshold, the validity determination module 7b determines that the face from which the eyes have been detected is NG, and regards the face as invalid for eye detection. Thus, the face is prevented from being used in the following blink detection process (which will be described later) or smile detection process (which will be described later). On the other hand, when the detection reliability is higher than the predetermined threshold, the validity determination module 7b determines that the face from which the eyes have been detected is OK, and regards the face as valid for eye detection. Thus, the face is allowed to be used in the following blink detection process or smile detection process.

Based on position information of the eyes detected by the eye detector 7, the smile detector 8 detects the smile degree of the face from which the eyes have been detected. Specifically, based on the coordinate information of the left and right eyes of each human face regarded as valid by the validity determination module 7b, the smile detector 8 searches for the position of a mouth in each reduced-luminance image over the reduced-luminance image data of all the image frames generated by rapid shooting, and calculates a smile value corresponding to the degree with which the corners of the mouth are slanting up.

Here, the smile detector 8 serves as a smile detection unit that detects a smile value (smile degree) of each face from which eyes have been detected by the eye detector 7, based on the position information of the detected eyes.

The blink detector 9 detects the blink degree (aperture) of the eyes detected by the eye detector 7. Specifically, the blink detector 9 sets blink detection windows W (see FIG. 5A) on the reduced-luminance image for the reduced-luminance image data of each image frame generated by the rapid shooting, based on the coordinate information of the left and right eyes of each human face regarded as valid by the validity determination module 7b. The blink detector 9 calculates an estimated value of each column C (see FIG. 5B) in each of the windows, and calculates a complement of a lowest estimated value as an estimated blink value. In other words, the blink detector 9 calculates the aperture of the human eyes, which is detected by the eye detector 7, as the estimated blink value. Thus, the estimated blink value indicates that the eye is opened more largely as the estimated blink value is larger.

The specific process contents of the blink detection process will be described later (see FIG. 4).

Here, the blink detector 9 serves as a blink detection unit that detects an estimated blink value (blink degree) of each eye detected by the eye detector 7.

In addition, the blink detector 9 has a smoothing module 9a for smoothing the detected estimated blink value between adjacent images. Specifically, the smoothing module 9a adds, averages and smoothes a detected estimated blink value of each image frame with estimated blink values of adjacent image frames in the vicinity of the image frame when the imaging frame rate in the rapid shooting is not lower than a predetermined value (for example, 10 fps). That is, when the imaging frame rate (continuously shooting rate) is not lower than the predetermined value, there is a high correlation between adjacent image frames. Therefore, when there is an image frame with partly open eyes between an image frame with fully open eyes and an image frame with fully closed eyes, the estimated blink value of the image frame with partly open eyes can be easily set at an intermediate value even if the estimated blink value is blurred to some extent.

Here, the smoothing module 9a serves as a smoothing unit that smoothes the detected estimated blink value (blink degree) between adjacent images when the imaging frame rate is not lower than the predetermined value.

The blink detector 9 also has a blink correction module 9b for correcting the detected estimated blink value in accordance with the smile value detected by the smile detector 8. Specifically, the blink correction module 9b determines whether the smile value is lower than a predetermined threshold or not. When the determination results in that the smile value is not lower than the predetermined threshold, points are added to the estimated blink value according to the following expression:

Estimated blink value+=$k$*(smile value−threshold)

Herein, k represents a predetermined constant

That is, human faces generally tend to have narrow eyes when they smile. Therefore, when the smile value is not lower than the predetermined threshold, the estimated blink value is corrected to a more proper value so that partly open eyes can be regarded as fully open eyes.

Here, the blink correction module 9b serves as a blink correction unit that corrects the detected estimated blink value (blink degree) in accordance with the smile value detected by the smile detector 8.

In addition, the blink detector 9 has a threshold calculation module 9c that calculates a threshold for determining whether eyes of each person are open or not, based on the detected blink degree of the person.

Here, the estimated blink value largely depends on the characteristics of each person, including the size of eyes, the thickness of eyelashes, etc. Therefore, the threshold calculation module 9c sets a threshold of blink determination for each person. In addition, it is difficult to set a threshold with which the status of open eyes can be distinguished accurately. Therefore, the threshold calculation module 9c sets an estimated blink value which is located at a predetermined ratio from the highest, as a temporary threshold Th1 for each person. When an estimated blink value is not lower than the temporary threshold Th1, the estimated blink value is regarded as OK in blink determination.

The threshold for blink determination is preferably set to be as large as possible in order to prevent a partly open eye status from being regarded as OK in the blink determination. However, if the threshold is set to be too large and severe, there may be a fear that, when the number of people to be photographed is large in a group photo or the like, there can be selected no image determined with eyes of all the people of the group being open. Therefore, the threshold calculation module 9c sets the threshold to vary in accordance with the number of people to be photographed. For example, an estimated value located at a ratio of N^(1/number of people) from the highest is set as a temporary threshold Th1 for each person so that a predetermined ratio (for example, a ratio N) of image frames where eyes have been detected can survive. Specifically, for example, assume that 20 percentages of the total continuously shot images where three people are put as subjects within an angle of view are intended to finally survive based on selection by blink detection. In this case, according to 0.2^(⅓)≈0.58, an estimated blink value located at a ratio of about 60 percentages from the highest is set for each person as the temporary threshold Th1 for determining whether blink of each image is OK or not.

Further, if a threshold for a person as a subject is too close to or too distant from the highest estimated blink value of the person, the threshold can be regarded as irrelevant. Therefore, with reference to the highest estimated blink value, the threshold calculation module 9c performs processing for clipping each of the upper and lower limits of the temporary threshold Th1 with a predetermined selected value in the following expression to calculate a real threshold Th2 for blink determination:

If ($Th1 > B$max−Ofst1) $Th2 = B$max−Ofst1;

else if ($Th1 < B$max+Ofst2) $Th2 = B$max+Ofst2;

else $Th2 = Th1$;

Herein, Bmax designates the highest estimated blink value for each person, Ofst1 designates an upper clipping offset, Ofst2 designates a lower clipping offset, Th1 designates a temporary threshold for blink determination, and Th2 designates a real threshold for blink determination.

In this manner, the threshold calculation module 9c serves as a threshold calculation unit that calculates a real threshold Th2 for determining whether eyes of each person are open or not, based on a detected estimated blink value (blink degree) of the person.

The blink detector 9 has a blink determination module 9d that determines whether or not eyes of each person are open in reduced-luminance image data of a plurality of image frames generated by rapid shooting. Specifically, the blink determination module 9d compares the real threshold Th2 calculated for blink determination by the threshold calculation module 9c with an estimated blink value of each person in each image frame, and determines whether the estimated blink value is lower than the real threshold Th2 or not. When the determination results in that the estimated blink value is not lower than the real threshold Th2, the blink is regarded as OK (open eyes). On the contrary, when the determination results in that the estimated blink value is lower than the real threshold Th2, the blink is regarded as NG (closed eyes).

Here, the blink determination module 9d serves as a blink determination unit that determines whether or not eyes of each person are open in each of the image frames generated by rapid shooting, based on the real threshold Th2 calculated for blink determination by the threshold calculation module 9c.

The blurring detector 10 detects an estimated blurring value (blurring amount) of each of the image frames generated by rapid shooting, relatively to an adjacent image frame. Specifically, assume that no human face has been detected in the face detection process from the reduced-luminance image data of the image frames generated by rapid shooting, or the number of faces which are valid for eye detection is zero in human faces detected from any one of the image frames. In this case, the blurring detector 10 divides each image frame into blocks each having a predetermined area, and calculates a differential value in each block between adjacent ones of the image frames. The differential value in the block which has the largest differential value of all the blocks in each image frame is set as an estimated blurring value of the image frame.

Here, the blurring detector 10 serves as a blurring detection unit that detects an estimated blurring value (blurring amount) for each of the image frames generated by rapid shooting, relatively to an adjacent image frame when no human face has been detected by the face detector 6.

The image selecting unit 11 estimates the statuses of human faces based on the estimated blink values calculated by the blink detector 9. Based on the estimated statuses, the image selecting unit 11 selects one captured image to be recorded on the recording medium 13 from a plurality of pieces of RAW image data generated by rapid shooting. Specifically, the image selecting unit 11 has an image determination module 11a that selects the number of faces with closed eyes from reduced-luminance image data of the image frames taken by rapid shooting.

The image determination module 11a serves as a first image determination unit, which determines whether or not there are a plurality of image frames with the smallest number of faces with closed eyes in reduced-luminance image data of the image frames taken by rapid shooting (first determination process), based on the result of determination by the blink determination module 9d. In addition, the image determination module 11a serves as a second image determination unit, which determines whether the number of faces with closed eyes is zero or not (second determination process) when the determination in the first determination process results in that there are a plurality of image frames with the smallest number of faces with closed eyes.

Then, the image selecting unit 11 selects one captured image to be recorded on the recording medium 13 in accordance with the determination results of the image determination module 11a. That is, when the determination in the first determination process results in that there are not a plurality of image frames with the smallest number of faces with closed eyes, the image selecting unit 11 selects, as one captured image to be recorded on the recording medium 13, RAW image data associated with the image frame with the smallest number of faces with closed eyes.

On the other hand, when the determination in the second determination process results in that the number of faces with closed eyes is zero, the image selecting unit 11 selects one image frame whose estimated blink value is the highest from the image frames with the smallest number of faces with closed eyes, based on the estimated blink value of each person detected by the blink detector 9. The image selecting unit 11 selects RAW image data associated with the selected image frame as one captured image to be recorded on the recording medium 13. On the contrary, when the determination in the second determination process results in that the number of faces with closed eyes is not zero, the image selecting unit 11 selects one image frame whose smile value is the highest from the image frames with the smallest number of faces with closed eyes, based on the smile value detected by the smile detector 8. The image selecting unit 11 selects RAW image data associated with the selected image frame as one captured image to be recorded on the recording medium 13.

On the other hand, when no human face is detected from any image frame by the face detector 6, or when human faces are detected from any one of image frames but the number of faces which are valid for eye detection is zero, the image selecting unit 11 selects, as one captured image to be recorded on the recording medium 13, RAW image data associated with an image frame which is the lowest in the estimated blurring value detected by the blurring detector 10.

In this manner, the image selecting unit 11 serves as an estimation unit that estimates the statuses of human faces based on their estimated blink values (blink degrees) calculated by the blink detector 9. The image selecting unit 11 also serves as a selecting unit that selects at least one captured image to be recorded on the recording medium 13, from a plurality of pieces of RAW image data generated by rapid shooting, based on the estimated statuses of the human faces.

The development unit 12 performs color processing including pixel interpolation processing, $\gamma$ correction processing etc. in a color processing circuit (not shown) upon the RAW image data selected by the image selecting unit 11. After that, the development unit 12 generates digital values as a luminance signal Y and color-difference signals Cb and Cr (YUV data).

The recording medium 13, for example, consists of a non-volatile memory (flash memory) or the like. The recording medium 13 stores image data for recording a photographed image encoded by a JPEG compression portion (not shown) of the development unit 12.

The display controller 14 performs control to read out the display image data temporarily stored in the image memory 5 and display the read-out image data in the display unit 15.

Specifically, the display controller 14 has a VRAM, a VRAM controller, a digital video encoder, etc. The digital video encoder reads out the luminance signal Y and the color difference signals Cb and Cr, which have been read from the image memory 5 and stored in the VRAM (not shown) under the control of the CPU 17, periodically from the VRAM through the VRAM controller. Based on the data read out thus, a video signal is generated and outputted to the display unit 15.

The display unit 15 is, for example, a liquid crystal display device, in which an image or the like taken by the electronic imaging unit 2 is displayed on a display screen based on the video signal from the display controller 14. Specifically, the display unit 15 displays a live-view image based on a plurality of image frames generated by imaging subjects in an imaging mode by the imaging lens unit 1, the electronic imaging unit 2 and the imaging controller 3, or a recording-view image taken as an actually photographed image.

The user interface 16 serves to perform a predetermined operation on the imaging apparatus 100. Specifically, the user interface 16 has a shutter button 16a associated with an instruction to image subjects, a mode button 16b associated with an instruction to select an imaging mode, a zoom button (not shown) associated with an instruction to adjust a zoom amount, etc. In accordance with the operation of these buttons, a predetermined operation signal is outputted to the CPU 17.

The CPU 17 controls each part of the imaging apparatus 100. Specifically, the CPU 17 performs various control operations in accordance with various processing programs (not shown) for the imaging apparatus 100.

Next, an image selection process according to an image selection method performed by the imaging apparatus 100 will be described with reference to FIGS. 2 to 4 and FIGS. 5A-5B.

Figure 2:
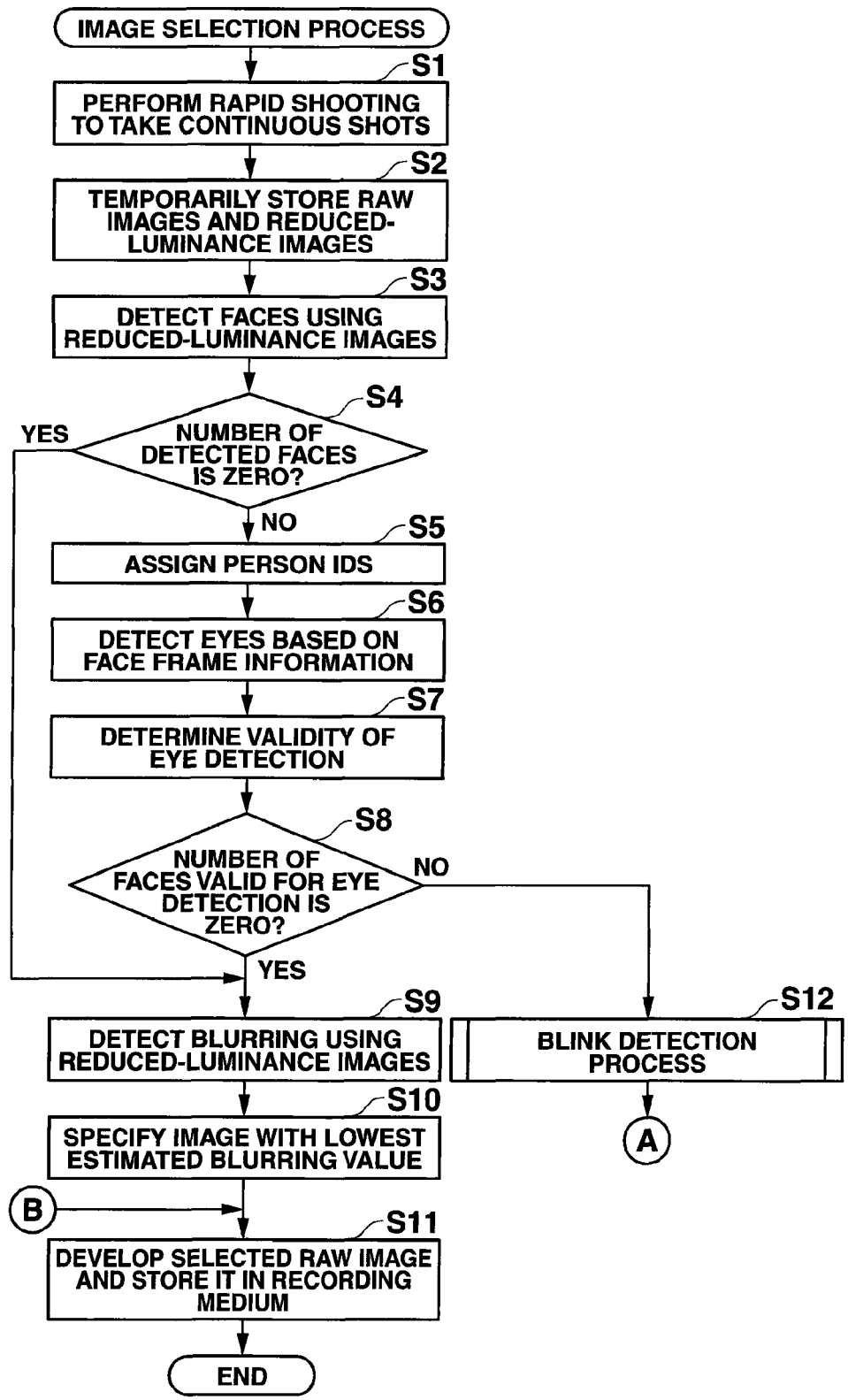
FIG. 2 is a flow chart showing an example of operation relating to an image selection process performed by the imaging apparatus shown in FIG. 1.
Figure 3:
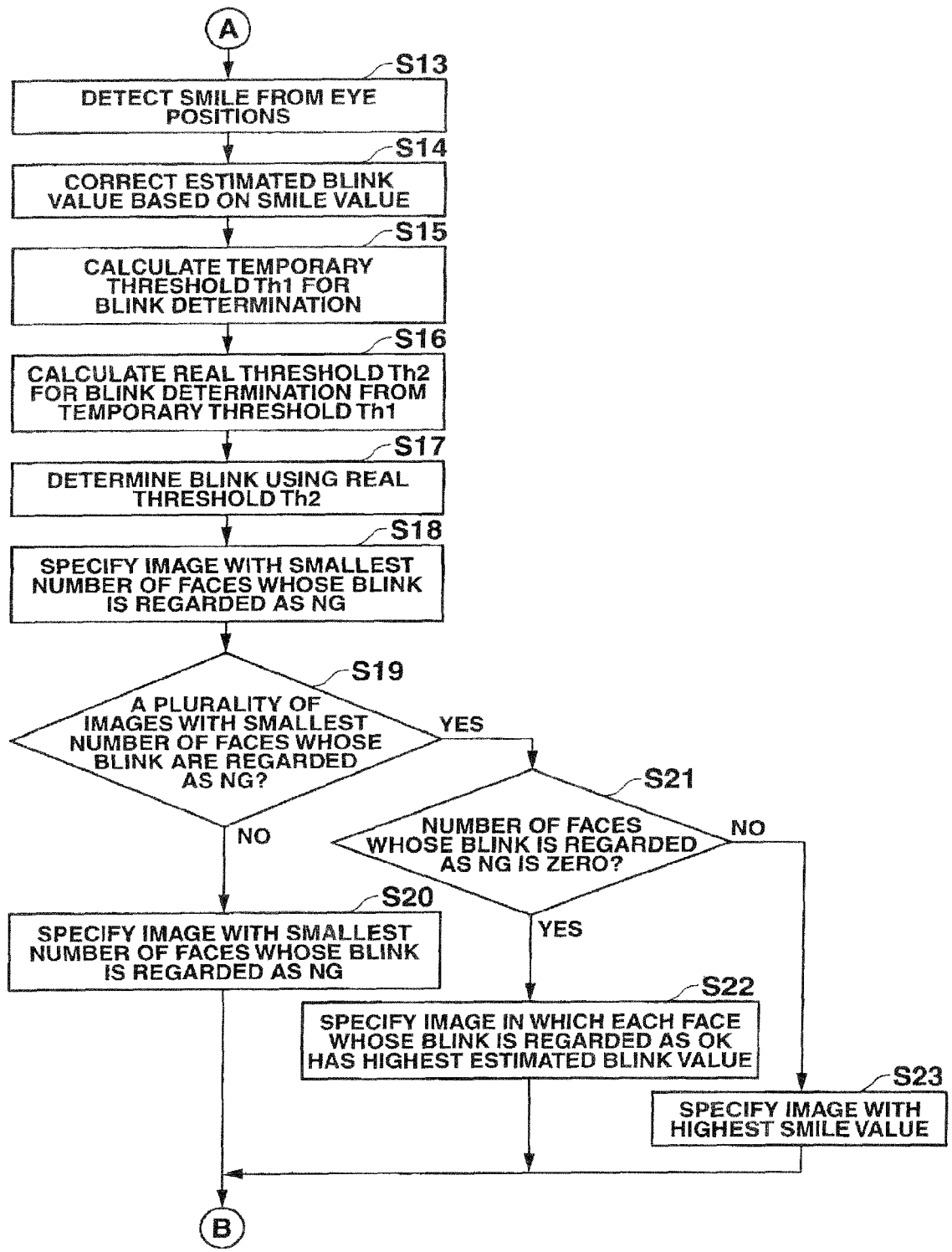
FIG. 3 is a flow chart showing the rest part for the image selection process in FIG. 2.
Figure 5A:
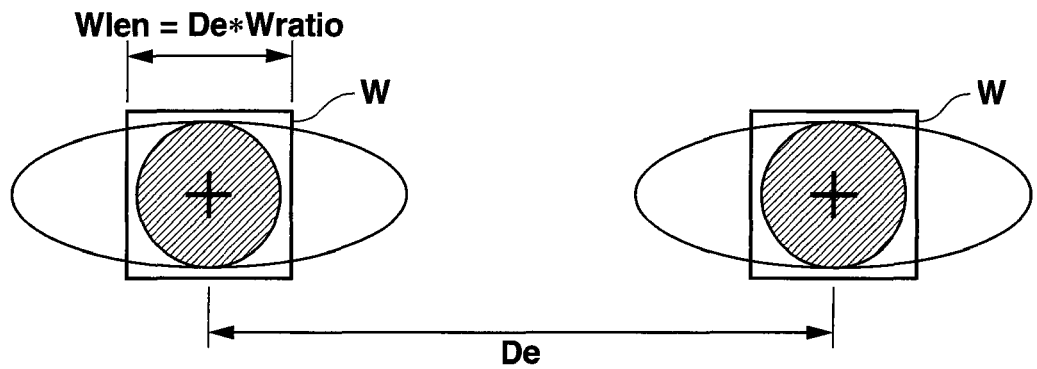
FIGS. 5A-5B are views schematically showing an image portion of eyes of a subject in the blink detection process of FIG. 4.
Figure 5B:
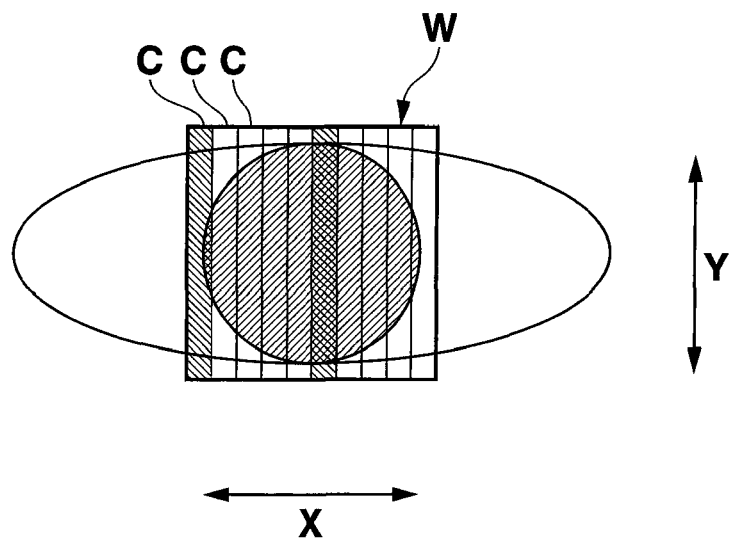

FIGS. 2 and 3 are flow charts showing an example of operation relating to the image selection process. FIG. 4 is a flow chart showing an example of operation relating to a blink detection process in the image selection process. FIG. 5A is a view schematically showing blink detection windows W and an image part including left and right eyes of a subject. FIG. 5B is an enlarged view schematically showing one of the blink detection windows W.

The image selection process is a process performed when an instruction to select an automatic image selection mode from a plurality of imaging modes displayed on a menu screen is issued by user's predetermined operation on the mode button 16b of the user interface 16.

As shown in FIG. 2, when an instruction to take continuous shots by rapid shooting is inputted based on user's predetermined operation on the shutter button 16a of the user interface 16, the CPU 17 first makes the imaging controller 3 adjust imaging conditions such as the focus position of the focus lens, the exposure conditions (shutter speed, diaphragm, gain, etc.), white balance, etc., and makes the electronic imaging unit 2 perform rapid shooting to take a predetermined number of (for example, 20) optical images of subjects continuously at a predetermined imaging frame rate (for example, 10 fps) (Step S1). Then, the CPU 17 makes the image data generator 4 generate RAW image data and reduced-luminance image data for each image frame of the subjects transmitted from the electronic imaging unit 2, and temporarily store those image data into the image memory 5 (Step S2).

Then, the CPU 17 makes the face detector 6 detect human faces from the reduced-luminance image data of each image frame by use of a predetermined face detection method, and generate image information in each detected face image region as face frame information (Step S3).

Successively, the CPU 17 determines whether the number of faces detected by the face detection process is zero or not, that is, whether face detection from any image frame is failed or not (Step S4). Here, when the determination results in that the number of detected faces is not zero (NO in Step S4), the CPU 17 performs processing for assigning person IDs to the human faces respectively based on the face frame information detected from each image frame (Step S5). Here, the person IDs are assigned on the following determination. That is, when the ratio of the distance between the centers of face frames in face frame information of adjacent image frames to the size (for example, width or length) of one of the face frames is not higher than a predetermined ratio (for example, about 50 percentages), the face frames are determined to belong to one and the same person. Here, when no face has been detected in one image frame by the face detection process, the CPU 17 acquires a face image region where a face has been detected most recently, from image frames around the image frame where no face has been detected. Based on the coordinates of the acquired face image region, the CPU 17 sets face frame information for the image frame where no face has been detected. Thus, the CPU 17 sets the person IDs in all the image frames.

Next, the CPU 17 makes the eye detector 7 detect left and right eyes of each person based on face frame information of each image frame generated by the face detector 6, and calculate the coordinates of the center of each detected eye. At the same time, the CPU 17 makes the reliability calculation module 7a of the eye detector 7 calculate detection reliability for the eye detection (Step S6).

Successively, based on whether the detection reliability calculated by the reliability calculation module 7a is higher than a predetermined threshold or not, the CPU 17 makes the validity determination module 7b of the eye detector 7 determine the validity of the face where eyes have been detected and which is associated with the reliability (Step S7). Specifically, when the detection reliability is not higher than the predetermined threshold, the validity determination module 7b regards a face associated with the eye detection as NG, and regards the face as invalid for eye detection. On the contrary, when the detection reliability is higher than the predetermined threshold, the validity determination module 7b regards a face associated with the eye detection as OK, and regards the face as valid for eye detection.

Next, based on a result of the determination by the validity determination module 7b, the CPU 17 determines whether the number of faces valid for eye detection (the number of valid-eye-detection faces) is zero or not (Step S8).

Here, when the determination results in that the number of valid-eye-detection faces is zero (YES in Step S8), the CPU 17 makes the blurring detector 10 perform a blurring detection process to divide each of the image frames into blocks each having a predetermined area, to calculate a differential value in each block between adjacent ones of the image frames, and to set the highest differential value of all the blocks as an estimated value of the image frame (Step S9). Also when the determination in Step S4 results in that the number of detected faces is zero (YES in Step S4), the CPU 17 moves processing to Step S9 to make the blurring detector 10 perform the blurring detection process.

After that, the CPU 17 makes the image selecting unit 11 specify RAW image data associated with an image frame with the lowest estimated blurring value detected by the blurring detector 10 (Step S10). Then, the CPU 17 makes the development unit 12 perform a development process on the RAW image data selected by the image selecting unit 11, to encode the image data in a JPEG format and store the encoded image data into the recording medium 13 (Step S11).

On the other hand, when the determination in Step S8 results in that the number of valid-eye-detection faces is not zero (NO in Step S8), the CPU 17 makes the blink detector 9 execute a blink detection process (Step S12).

Here, the blink detection process will be described in detail with reference to FIG. 4 and FIGS. 5A and 5B.

As shown in FIG. 4, the blink detector 9 calculates an average distance De between left and right eyes of each person regarded as valid by the validity determination module 7b, based on the coordinate information of the left and right eyes of the person (Step S31).

Successively, the blink detector 9 sets blink detection windows W (see FIG. 5A) on each reduced-luminance image based on the reduced-luminance image data of all the image frames (Step S32). Here, the size Wlen of each blink detection window W is determined by multiplying the average distance De between the left and right eyes by a coefficient Wratio according to the following expression so that the size Wlen can occupy a predetermined ratio to the average distance De.

$$Wlen=De*Wratio$$

The central positions of the blink detection windows W are set in the coordinate values of the left and right eyes received by eye detection respectively.

Next, the blink detector 9 calculates an estimated value as to each column C (see FIG. 5B) into which each set blink detection window W is divided at a predetermined interval in the left/right direction (X-axis direction) (Step S33). Specifically, the blink detector 9 sorts vertical (Y-axis direction) pixel values in each column C in the order of luminance from lowest to highest. The blink detector 9 averages a predetermined percentage of the pixel values from the highest and sets the averaged value as an estimated value of the column C. Thus, a dark area of an eye may be reduced due to its blink, or a white area of the eye may appear near the center of the dark area due to reflection of light, or the dark area of the eye may be blurred due to blurring of the face. Even in such a case, due to the estimated value increasing in a vertically long place of the dark area of the eye, the value of the place where the dark area of the eye is the longest can be acquired.

Next, the blink detector 9 selects the lowest estimated value of the estimated values in all the columns C (Step S34), and calculates a complement of the lowest estimated value as an estimated blink value so that the estimated value can be increased when the eye is open (Step S35).

Next, the blink detector 9 determines whether the imaging frame rate during the rapid shooting is at least a predetermined value (for example, 10 fps) or not (Step S36). Here, when the determination results in that the imaging frame rate is at least the predetermined value (YES in Step S36), the smoothing module 9a of the blink detector 9 adds and averages the estimated blink value of each image frame with estimated blink values of adjacent image frames so as to smooth the estimated blink values (Step S37). As a result, when there is an image frame with partly open eyes between an image frame with fully open eyes and an image frame with fully closed eyes, the estimated blink value of the image frame with partly open eyes can be set easily as an intermediate value even if the estimated blink value of the image frame is blurred to some extent.

On the contrary, when the imaging frame rate is lower than the predetermined value (NO in Step S36), the correlation between adjacent image frames is lowered due to a time interval between the adjacent image frames. In this case, the estimated blink value calculated in Step S36 is set as a final estimated value without performing the smoothing processing.

Thus, the blink detection process is terminated.

As shown in FIG. 3, the CPU 17 makes the smile detector 8 search for the position of a mouth of each human face in the reduced-luminance image based on the coordinate information of left and right eyes of the human face, and calculate a smile value in accordance with the degree with which the corners of the mouth are slanting up (Step S13).

Successively, the CPU 17 makes the blink correction module 9b of the blink detector 9 determine whether the smile value detected by the smile detector 8 is at least a predetermined threshold or not. When the determination results in that the smile value is at least the predetermined threshold, the CPU 17 makes the blink correction module 9b add points to the estimated blink value according to the following expression so as to correct the estimated blink value (Step S14).

$$\text{Estimated blink value}+=k*(\text{smile value}-\text{threshold})$$

Herein, k designates a predetermined constant.

Next, the CPU 17 makes the threshold calculation module 9c of the blink detector 9 set an estimated blink value located at a predetermined ratio from the highest, as a temporary threshold Th1 for each person (Step S15). Specifically, the threshold calculation module 9c sets an estimated value located at a ratio of $N^{(1/\text{number of people})}$ from the highest, as a temporary threshold Th1 for each person, in order to vary the threshold in accordance with the number of photographed people, so that a predetermined ratio (for example, a ratio N) of image frames where eyes have been detected can survive.

Successively, with reference to the highest estimated blink value, the threshold calculation module 9c performs processing for clipping the upper and lower limits of the temporary threshold Th1 with a predetermined selected value in accordance with the following expression to calculate a real threshold Th2 for blink determination (Step S16):

If $(Th1>Bmax-Ofst1)$ $Th2=Bmax-Ofst1$;

else if $(Th1<Bmax+Ofst2)$ $Th2=Bmax+Ofst2$;

else $Th2=Th1$;

Herein, Bmax designates the highest estimated blink value for each person, Ofst1 designates an upper clipping offset, Ofst2 designates a lower clipping offset, Th1 designates a temporary threshold for blink determination, and Th2 designates a real threshold for blink determination.

Next, the CPU 17 makes the blink determination module 9d of the blink detector 9 compare the real threshold Th2 calculated for blink determination by the threshold calculation module 9c with an estimated blink value of each person in each image frame, and determine whether the estimated blink value is at least the real threshold Th2 or not (Step S17). When the determination results in that the estimated blink value is at least the real threshold Th2, the blink determination is regarded as OK (open eyes). On the contrary, when the determination results in that the estimated blink value is not at least (is lower than) the real threshold Th2, the blink determination is regarded as NG (closed eyes).

Next, the CPU 17 makes the image selecting unit 11 specify an image frame with the smallest number of faces with closed eyes from the reduced-luminance image data of the image frames generated by the rapid shooting (Step S18).

Next, the CPU 17 makes the image determination module 11a of the image selecting unit 11 determine whether there are a plurality of image frames with the smallest number of faces with closed eyes or not (Step S19). Here, when the determination results in that there are not a plurality of image frames with the smallest number of faces with closed eyes (NO in Step S19), the CPU 17 makes the image selecting unit 11 specify RAW image data associated with the image frame with the smallest number of faces with closed eyes as one captured image to be recorded on the recording medium 13 (Step S20).

After that, the CPU 17 moves processing to Step S11 (see FIG. 2) to make the development unit 12 perform a development process upon the RAW image data associated with the image frame with the smallest number of faces with closed eyes selected by the image selecting unit 11. Thus, the image data encoded in a JPEG format is stored in the recording medium 13 (Step S11).

On the contrary, when the determination in Step S19 results in that there are a plurality of image frames with the smallest number of faces with closed eyes (YES in Step S19), the CPU 17 makes the image determination module 11a determine whether the number of faces with closed eyes is zero or not (Step S21).

Here, when the determination results in that the number of faces with closed eyes is zero (YES in Step S21), the CPU 17 makes the image selecting unit 11 specify one image frame whose estimated blink value is the highest from the image frames with the smallest number of faces with closed eyes, based on the estimated blink value of each person detected by the blink detector 9. The CPU 17 makes the image selecting unit 11 specify RAW image data associated with the selected image frame as one captured image to be recorded on the recording medium 13 (Step S22).

After that, the CPU 17 moves processing to Step S11 (see FIG. 2) to make the development unit 12 perform a development process upon the RAW image data with the highest estimated blink value selected by the image selecting unit 11. Thus, the image data encoded in a JPEG format is stored in the recording medium 13 (Step S11).

On the contrary, when the determination in Step S21 results in that the number of faces with closed eyes is not zero (NO in Step S21), the CPU 17 makes the image selecting unit 11 specify one image frame whose smile value is the highest from the image frames with the smallest number of faces with closed eyes, based on the smile value detected by the smile detector 8. The CPU 17 makes the image selecting unit 11 specify RAW image data associated with the selected image frame as one captured image to be recorded on the recording medium 13 (Step S23).

After that, the CPU 17 moves processing to Step S11 (see FIG. 2) to make the development unit 12 perform a development process upon the RAW image data with the highest smile value selected by the image selecting unit 11. Thus, the image data encoded in a JPEG format is stored in the recording medium 13 (Step S11).

In this manner, according to the imaging apparatus 100 in this embodiment, the face detector 6 detects human faces from a plurality of image frames generated by rapid shooting. The eye detector 7 detects eyes from each detected human face. The blink detector 9 calculates an estimated blink value of the detected eyes. The image selecting unit 11 estimates the statuses of the human faces based on their estimated blink values, and selects one captured image to be recorded on the recording medium 13 from the image frames based on the estimated statuses of the human faces.

Specifically, eyes of a human face are detected for each person by the eye detector 7 based on face frame information generated by the face detector 6. As for each human face whose eyes are detected with eye detection reliability higher than a predetermined threshold and which is determined to be valid, the image selecting unit 11 determines the status of the human face for each person. Further, an estimated blink value of eyes is detected for each person by the blink detector 9. The image selecting unit 11 determines the status of the human face for each person based on the estimated blink value corrected in accordance with a smile value of the face detected based on the position information of the eyes.

Thus, the status of the human face including the blink degree, the smile degree etc. is comprehensively determined for each person so that an image to be recorded on the recording medium 13 can be selected properly. Even if the number of continuously shootable images increases, one image can be selected simply and easily.

In addition, in the blink detection process, based on the estimated blink value of each person, a real threshold Th2 for determining whether eyes of the person are open or not is calculated. Based on the real threshold Th2 for blink determination, a plurality of image frames are determined as to whether eyes of each person are open or not. Thus, the real threshold Th2 for blink determination can be set based on the estimated blink value detected in consideration of the size or thinness of eyes, the tendency for the eyes to open, etc., differing from one person to another. Thus, based on the real threshold Th2, the image frames can be determined properly as to whether eyes of each person are open or not.

Further, whether there are a plurality of image frames with the smallest number of faces with closed eyes among the plurality of image frames or not is determined. When the determination results in that there are not a plurality of image frames with the smallest number of faces with closed eyes, that is, there is one image frame with the smallest number of faces with closed eyes, the image selecting unit 11 selects RAW image data associated with that image frame as one captured image to be recorded on the recording medium 13. Thus, it is possible to surely select an image where all the people do not close their eyes.

On the other hand, when the determination results in that there are a plurality of image frames with the smallest number of faces with closed eyes, whether the number of faces with closed eyes is zero or not is determined. When the determination results in that the number of faces with closed eyes is zero, the image selecting unit 11 selects one image frame whose estimated blink value is the highest from the image frames with the smallest number of faces with closed eyes, based on the estimated blink value of each person detected by the blink detector 9. The image selecting unit 11 selects RAW image data associated with the selected image frame as one captured image to be recorded on the recording medium 13. Thus, it is possible to surely select an image whose estimated blink value is the highest. On the contrary, when the determination results in that the number of faces with closed eyes is not zero, the image selecting unit 11 selects one image frame whose smile value is the highest from the image frames with the smallest number of faces with closed eyes, based on the smile value detected by the smile detector 8. The image selecting unit 11 selects RAW image data associated with the selected image frame as one captured image to be recorded on the recording medium 13. Thus, it is possible to surely select an image whose smile value is the highest even if there is any person with his/her eyes closed.

Further, when no human face is detected from any image frame by the face detector 6, or when human faces are detected from any one of image frames but the number of faces which are valid for eye detection is zero, the image selecting unit 11 selects, as one captured image to be recorded on the recording medium 13, RAW image data associated with an image frame which is the lowest in the estimated blurring value detected by the blurring detector 10. Thus, it is possible to surely select an image whose blurring amount is the lowest.

In this manner, not only the statuses of human faces including their blink degrees, their smile degrees etc. but also image blurring including subject blurring or hand blurring are determined comprehensively so that an image to be recorded on the recording medium 13 can be selected properly, simply and easily.

A modification of the imaging apparatus 100 will be described below.

The imaging apparatus 100 according to this modification detects a blurring amount of each image frame valid for eye detection with respect to an image adjacent to the image frame. In accordance with whether there are a plurality of captured images where the blurring amount of each image frame is smaller than a predetermined value or not, a blink detection process is performed, or the image frame with the smallest blurring amount is selected as one captured image to be recorded on the recording medium 13.

Figure 6:
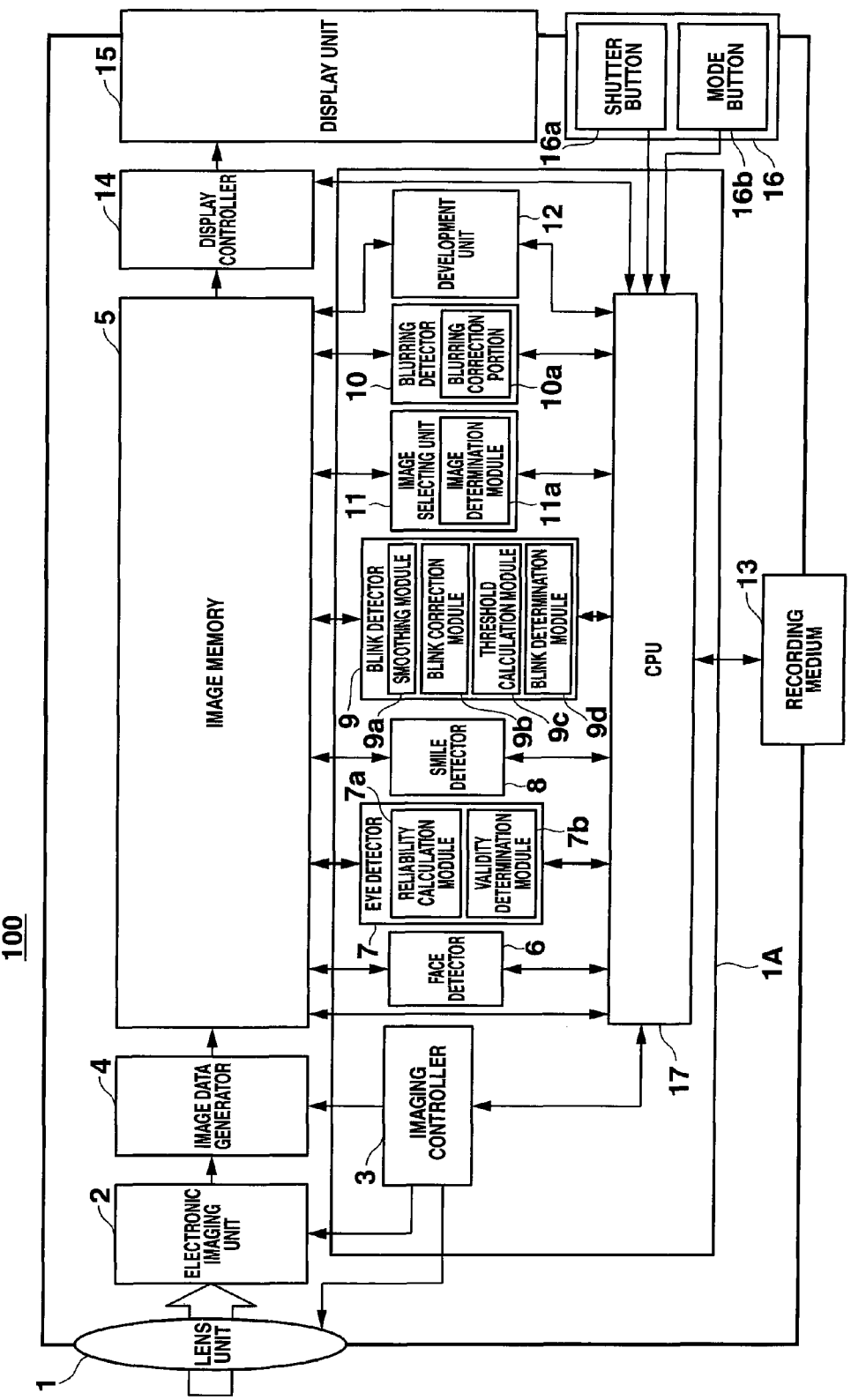
FIG. 6 is a block diagram showing a schematic configuration of an imaging apparatus according to a modification.

FIG. 6 is a block diagram showing a schematic configuration of the imaging apparatus 100 according to the modification.

As shown in FIG. 6, the blurring detector 10 of the imaging apparatus 100 according to this modification has a blurring correction portion 10a that corrects the detected blurring amount of each image frame in accordance with the position of blurring relative to the positions of faces.

Specifically, when human faces are detected from any one of image frames but the number of faces valid for eye detection is not zero, the blurring detector 10 calculates, for each image frame, a differential value in each block between each image frame and another image frame adjacent thereto. The highest differential value of all the blocks is set as an estimated blurring value (blurring amount) of the image frame. On this occasion, the blurring correction portion 10a corrects the estimated blurring value so that the estimated blurring value becomes lower as the block with the highest differential value is located at a longer distance from any block where there is a face.

Here, the blurring correction portion 10a serves as a blurring correction unit that corrects the estimated blurring value (blurring amount) of each image frame detected by the blurring detector 10, in accordance with the position of blurring relative to the positions of faces.

In addition, the image determination module 11a of the image selecting unit 11 serves as a third image determination unit, which determines whether there are a plurality of image frames whose estimated blurring values are lower than a predetermined blurring detection threshold or not, when human faces are detected from any one of image frames but the number of faces valid for eye detection is not zero.

When the determination results in that there are not a plurality of image frames whose estimated blurring values are lower than the predetermined blurring detection threshold, the image selecting unit 11 selects, as one captured image to be recorded on the recording medium 13, RAW image data associated with an image frame which is the lowest in the estimated blurring value detected by the blurring detector 10.

Next, an image selection process performed by the imaging apparatus 100 according to the modification will be described with reference to FIG. 7.

Figure 7:
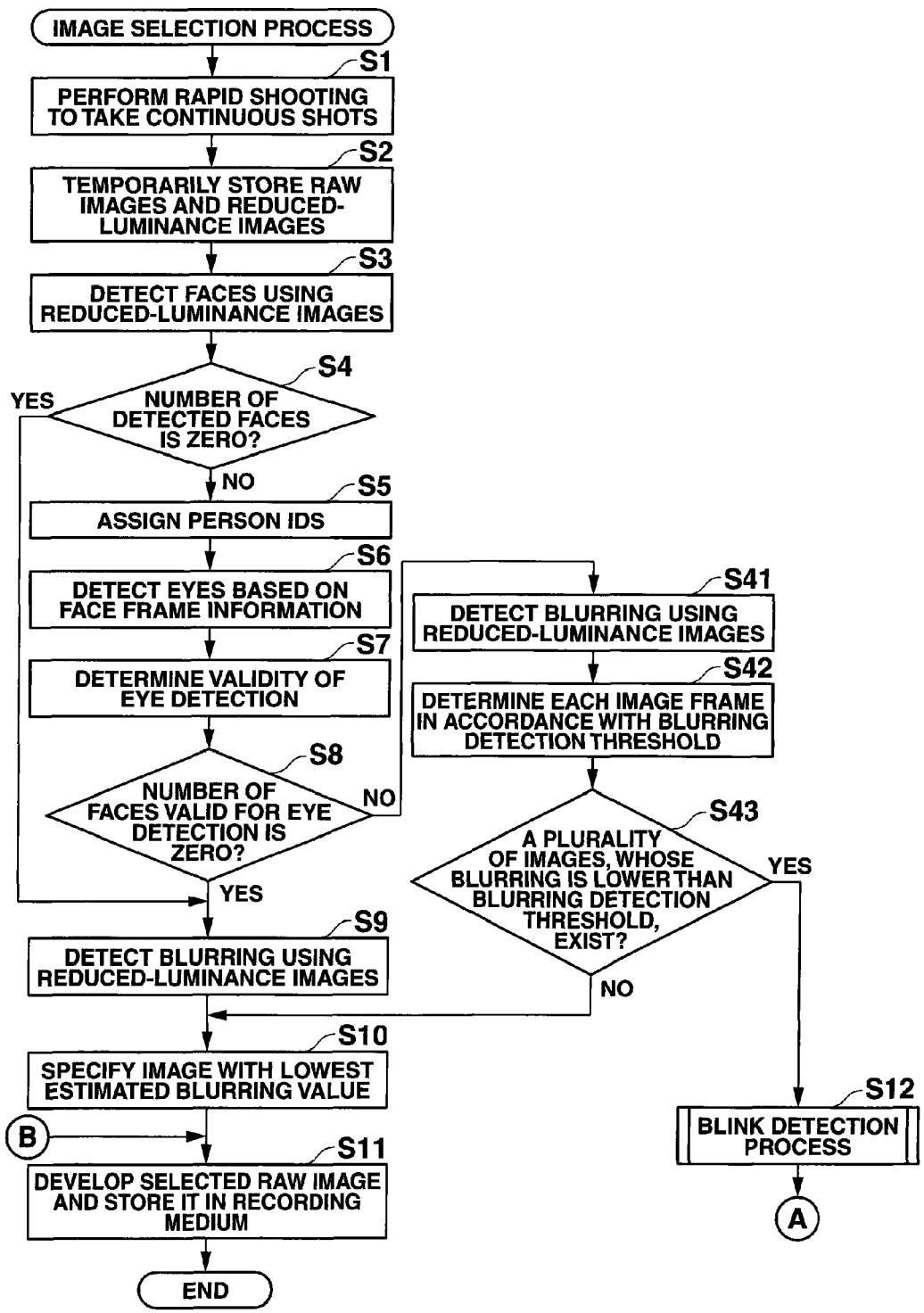
FIG. 7 is a flow chart showing an example of operation relating to an image selection process performed by the imaging apparatus of FIG. 6.

FIG. 7 is a flow chart showing an example of operation relating to the image selection process. Processing on and after a blink detection process (Step S12) in FIG. 7 is the same as the processing shown in the flowchart showing the rest part for the image selection process in FIG. 3, and detailed description thereof will be omitted.

As shown in FIG. 7, in the same manner as in the aforementioned embodiment, when an instruction to take continuous shots by rapid shooting is inputted based on user's predetermined operation on the shutter button 16a of the user interface 16, the CPU 17 makes the imaging controller 3 adjust predetermined imaging conditions, and makes the electronic imaging unit 2 perform rapid shooting to take a predetermined number of optical images of subjects continuously at a predetermined imaging frame rate (Step S1). In the same manner as in the aforementioned embodiment, the CPU 17 makes the image data generator 4 generate RAW image data and reduced-luminance image data for each image frame of the subjects transmitted from the electronic imaging unit 2, and temporarily store those image data into the image memory 5 (Step S2).

Then, in the same manner as in the aforementioned embodiment, the CPU 17 makes the face detector 6 detect human faces from the reduced-luminance image data of each image frame, and generate image information in each detected face image region as face frame information (Step S3).

Successively, in the same manner as in the aforementioned embodiment, the CPU 17 determines whether the number of faces detected by the face detection process is zero or not (Step S4). Here, when the determination results in that the number of detected faces is not zero (NO in Step S4), in the same manner as in the aforementioned embodiment, the CPU 17 assigns person IDs to the human faces respectively based on the face frame information detected from each image frame (Step S5), and then makes the eye detector 7 detect left and right eyes of each person based on face frame information of each image frame generated by the face detector 6, and calculate the coordinates of the left and right eyes of the person (Step S6).

Successively, in the same manner as in the aforementioned embodiment, the CPU 17 makes the validity determination module 7b of the eye detector 7 determine the validity of each face where eyes have been detected (Step S7), and then determines whether the number of faces valid for eye detection (the number of valid-eye-detection faces) is zero or not (Step S8).

When the determination in Step S8 results in that the number of valid-eye-detection faces is not zero (NO in Step S8), the CPU 17 makes the blurring detector 10 perform a blurring detection process to divide each image frame associated with faces valid for eye detection into blocks each having a predetermined area, to calculate a differential value in each block between the image from and an adjacent image frame, and to set the highest differential value of all the blocks as an estimated value of the image frame (Step S41). On this occasion, the blurring correction portion 10a of the blurring detector 10 corrects the estimated blurring value so that the estimated blurring value becomes lower as the block with the highest differential value is located at a longer distance from any block where there is a face.

Successively, based on a predetermined blurring detection threshold, the CPU 17 makes the image selecting unit 11 determine whether the estimated blurring value of each image frame is lower than the blurring detection threshold or not (Step S42), and determine whether there are a plurality of image frames whose estimated blurring values are lower than the predetermined blurring detection threshold or not (Step S43).

Here, when the determination results in that there are not a plurality of image frames whose estimated blurring values are lower than the predetermined blurring detection threshold (NO in Step S43), the CPU 17 moves processing to Step S10 to make the image selecting unit 11 specify RAW image data associated with an image frame with the lowest estimated blurring value detected by the blurring detector 10 (Step S10) in the same manner as in the aforementioned embodiment. After that, in the same manner as in the aforementioned embodiment, the CPU 17 makes the development unit 12 perform a development process on the RAW image data selected by the image selecting unit 11, to encode the image data in a JPEG format and store the encoded image data into the recording medium 13 (Step S11).

On the contrary, when the determination results in that there are a plurality of image frames whose estimated blurring values are lower than the predetermined blurring detection threshold (YES in Step S43), the CPU 17 makes the blink detector 9 execute a blink detection process (Step S12) in the same manner as in the aforementioned embodiment.

Processing on and after the blink detection process is the same as that in the aforementioned embodiment, and detailed description thereof will be omitted.

Thus, according to the imaging apparatus 100 in this modification, determination is made as to whether there are a plurality of image frames whose estimated blurring values are lower than a predetermined blurring detection threshold or not. When the determination results in that there are a plurality of image frames whose estimated blurring values are lower than the predetermined blurring detection threshold, a blink detection process is performed. It is therefore possible to comprehensively judge the status of a face of each person including the blink degree, the smile degree etc. in image frames which are lower in subject blurring or hand blurring. Thus, it is possible to properly select an image to be recorded on the recording medium 13.

On the contrary, when the determination results in that there are not a plurality of image frames whose estimated blurring values are lower than the predetermined blurring detection threshold, RAW image data associated with an image frame with the lowest estimated blurring value detected by the blurring detector 10 is selected as one captured image to be recorded on the recording medium 13. Thus, it is possible to surely select an image with the smallest blurring amount.

Further, in the blurring detection process, each estimated blurring value is corrected so that the estimated blurring value becomes lower as the block with the highest differential value is located at a longer distance from any block where there is a face. Thus, in consideration of the distance between the position of each face and the position where blurring occurs, it is possible to thereafter determine whether there are a plurality of image frames whose estimated blurring values are lower than the predetermined blurring detection threshold or not.

That is, blurring in an image frame where blurring occurs in some degree can be ignored to some extent if the position where the blurring occurs is far from any face. Thus, in such a case, the blink determination process or the like can be performed upon the image frame. As a result, an image to be recorded on the recording medium 13 can be properly selected from a larger number of image frames.

Although any one of image data was selected in the image selection process according to the aforementioned embodiment, the invention is not limited thereto. For example, image frames relating to rapid shooting may be evaluated in accordance with their blink degrees, smile degrees, blurring degrees, etc., and then sorted in the order of valuation from highest to lowest. In this case, a desired image frame may be appointed and selected by a user.

In addition, image data associated with all the image frames may be sorted in the order of valuation from highest to lowest and stored in the recording medium 13.

Further, the aforementioned image selection process may be performed during image reproduction. That is, image frames relating to rapid shooting and recorded on the recording medium 13 may be evaluated in accordance with their blink degrees, smile degrees, blurring degrees, etc., and then recorded again on the recording medium 13. Moreover, the image frames sorted in the order of valuation from highest to lowest may be reproduced and displayed at a predetermined interval.

In addition, a face detection process may be performed on a live-view image so that the number of continuous shots can be adjusted in accordance with the statuses of detected faces. Specifically, during rapid shooting, a face detection process may be performed due to a half-push state of the shutter button 16a, so as to do setting to increase the number of continuous shots by the rapid shooting in accordance with the number of people whose faces have been detected. That is, with increase in the number of people to be photographed as subjects, the probability that all the people open their eyes becomes lower. Therefore, when the number of continuous shots is increased, an image where all the people open their eyes can be selected surely.

Further, during rapid shooting, a face detection process may be performed due to a half-push state of the shutter button 16a, so as to do setting to follow the motion of a detected face and to increase the number of continuous shots in accordance with the size of the face. That is, with increase in the motion of the face, subject blurring is likely to occur in the face, or the probability that the face faces the front becomes lower. Therefore, when the number of continuous shots is increased, an image where subject blurring is prevented or the face faces the front can be selected surely.

Further, the image memory 5 may has a ring buffer (not shown) serving as a reception unit, which can temporarily store a predetermined number of image frames. In this case, a plurality of image frames generated by the electronic imaging unit 2 are stored temporarily. When the determination in the blink detection process results in that all the people open their eyes, the shutter may be released automatically. Thus, it is possible to surely acquire an image where all the people open their eyes.

In the smile detection process according to the aforementioned embodiment, the size of a human face occupying the whole of an image or the position of the face (for example, whether the face is located in a central portion of the image as a whole or in a peripheral portion thereof) may be added to estimation items as well as estimation of the smile degree of the face. The smile value may be corrected in accordance with the estimation items.

Further, the recording medium 13 may have a person registration database (not shown) as a person registration unit. In this case, the face detection process or the assignment of person IDs may be performed using the database. Further, when a person registered in the person registration database is detected in the face detection process, the image selection process may be performed in deeper consideration of the face status of the person than that of any other person. That is, when a face detected by the face detector 6 corresponds to a person registered in the person registration database, the image selecting unit 11 may correct the estimated value concerned with the face. For example, the thresholds of determination for the person in the blink detection process and the smile detection process are made severer while the thresholds for any other person are made gentler. Thus, it is possible to specify an image where at least the person in question opens his/her eyes or smiles.

In addition, when a face is detected from any one of image frames at the time of assignment of person IDs, detected face frame information may be used as a template to perform the face detection process from the other image frames. Thus, the human face can be detected surely from all the image frames, and the accuracy in the following eye detection process, smile detection process or blink detection process can be more improved.

Further, when the face detection process and the eye detection process are performed, left and right eyes of a human face may be detected from any one of image frames. In this case, regions around the eyes are used as templates to perform template matching between the image frame and another image frame adjacent thereto. When the template matching succeeds, the operation of the face detection process and the eye detection process may be skipped.

In the image selection process, when no image where all the people open their eyes can be found, an image with the highest estimation may be selected. As for a person with closed eyes in the selected image, portions around the eyes may be cut out from another image frame where the eyes are open, and combined with the image with the highest estimation.

The configuration of the imaging apparatus 100 is described in the aforementioned embodiment by way of example. The invention is not limited to the configuration of the embodiment. Although the imaging apparatus 100 is described as an image selection device by way of example, the invention is not limited thereto. For example, continuous shots may be taken by another imaging apparatus than the imaging apparatus 100, and an image selection device may be provided for recording only image data transmitted from the imaging apparatus and carrying out only the image selection process.

In the aforementioned embodiment, configuration is made so that functions as the reception unit, the face detection unit, the eye detection unit, the blink detection unit, the estimation unit and the selecting unit were implemented by the electronic imaging unit 2, the imaging controller 3, the face detector 6, the eye detector 7, the blink detector 9 and the image selecting unit 11 driven under the control of the CPU 17. The invention is not limited to the configuration. Configuration may be made so that those functions are implemented by a predetermined program or the like performed by the CPU 17.

That is, a program including an acquisition process routine, a face detection process routine, an eye detection process routine, a blink detection process routine, an estimation process routine and a selecting process routine is stored in advance in a program memory (not shown) for storing programs. Then, the acquisition process routine may make the CPU 17 acquire a plurality of captured images generated by rapid shooting of subjects. In addition, the face detection process routine may make the CPU 17 detect human faces from the captured images generated by the rapid shooting. In addition, the eye detection process routine may make the CPU 17 detect eyes from the human faces detected by the face detection process routine. In addition, the blink detection process routine may make the CPU 17 detect the blink degrees of the eyes detected by the eye detection process routine. In addition, the estimation process routine may make the CPU 17 estimate the statuses of the human faces based on the blink degrees detected by the blink detection process routine. In addition, the selecting process routine may make the CPU 17 specify at least one captured image to be recorded on the recording medium 13 from the acquired captured images, based on the estimated statuses of the human faces.

What is claimed is:

1. An image selection device comprising:
    a reception unit that receives a plurality of captured images obtained by rapid shooting one or more people as subjects;
    a face detection unit that detects human faces included in each of the captured images received by the reception unit;
    an eye detection unit that detects eyes in each of the human faces detected by the face detection unit;
    a blink detection unit that detects blink degrees of each of the eyes detected by the eye detection unit; and
    a selecting unit that selects at least one captured image which includes eyes having blink degrees higher than the blink degrees of the eyes included in the other captured images from among the captured images received by the reception unit.

2. The image selection device according to claim 1, further comprising:
    a threshold calculation unit that calculates a threshold for determining whether the eyes of each of the people are opened or not, based on the blink degree of the eyes of each of the people detected by the blink detection unit; and
    a blink determination unit that determines whether the eyes of each of the people are opened or not in each of the captured images received by the reception unit, based on the threshold calculated by the threshold calculation unit.

3. The image selection device according to claim 2, further comprising:
    a first image determination unit that determines whether or not there are a plurality of captured images with a minimum number of faces with closed eyes in the captured images received by the reception unit, based on a result of the determination by the blink determination unit,
    wherein, when the first image determination unit determines that there is not a plurality of captured images with the minimum number of faces with closed eyes, the selecting unit selects the captured image with the minimum number of faces with closed eyes from among the plurality of captured images as one captured image to be recorded on a recording medium.

4. The image selection device according to claim 3, further comprising:
    a second image determination unit that determines, when the first image determination unit determines that there are a plurality of captured images with the minimum number of faces with closed eyes, whether the minimum number of faces with closed eyes is zero or not,
    wherein, when the second image determination unit determines that the minimum number of faces with closed eyes is zero, the selecting unit selects the captured image to be recorded on the recording medium based on the blink degrees of the eyes of each of the people detected by the blink detection unit.

5. The image selection device according to claim 3, further comprising:
    a smile detection unit that detects smile degrees of the faces with the eyes detected by the eye detection unit based on position information of the detected eyes; and
    a second image determination unit that determines, when the first image determination unit determines that there are a plurality of captured images with the minimum number of faces with closed eyes, whether the minimum number of faces with closed eyes is zero or not,
    wherein, when the second image determination unit determines that the minimum number of faces with closed eyes is not zero, the selecting unit selects the captured image to be recorded on the recording medium based on the smile degrees detected by the smile detection unit.

6. The image selection device according to claim 1, wherein the reception unit comprises a ring buffer that temporarily stores a predetermined number of image frames.

7. The image selection device according to claim 1, further comprising:
   an imaging unit that captures the captured images,
   wherein a number of images continuously taken by the imaging unit is set in accordance with the faces detected by the face detection unit.

8. The image selection device according to claim 1, further comprising:
   a blurring detection unit that detects a blurring amount of each of the captured images received by the reception unit relatively to an adjacent image when no human face is detected by the face detection unit,
   wherein the selecting unit selects a captured image with the smallest blurring amount detected by the blurring detection unit, as the captured image to be recorded on a recording medium.

9. The image selection device according to claim 1, further comprising:
   an estimation unit that estimates statuses of the human faces based on the blink degrees detected by the blink detection unit,
   wherein the selecting unit selects at least one of the captured images including the eyes having the blink degrees higher than the blink degrees of the eyes included in the other captured images from among the captured images received by the reception unit, based on the statuses of the human faces estimated by the estimation unit.

10. The image selection device according to claim 9, further comprising:
    a smile detection unit that detects smile degrees of the faces with the eyes detected by the eye detection unit based on position information of the detected eyes; and
    a blink correction unit that corrects the blink degrees detected by the blink detection unit based on the smile degrees detected by the smile detection unit,
    wherein the selecting unit determines the statuses of the human faces in accordance with the blink degrees corrected by the blink correction unit.

11. The image selection device according to claim 9, further comprising:
    a reliability calculation unit that calculates reliability as to detection of eyes performed by the eye detection unit; and
    a validity determination unit that determines validity of each face with the detected eyes associated with the reliability calculated by the reliability calculation unit based on whether the reliability is higher than a predetermined threshold or not,
    wherein the selecting unit determines the statuses of the human faces determined to be valid by the validity determination unit.

12. The image selection device according to claim 11, further comprising:
    a blurring detection unit that detects a blurring amount of each of captured images which belongs to the captured images received by the reception unit and which includes faces determined to be valid by the validity determination unit, relatively to an adjacent image; and
    a third image determination unit that determines whether or not there are a plurality of captured images whose blurring amounts detected by the blurring detection unit are smaller than a predetermined value,
    wherein, when the third image determination unit determines that there are a plurality of captured images whose blurring amounts are smaller than the predetermined value, the blink detection unit detects blink degrees of the eyes detected by the eye detection unit.

13. The image selection device according to claim 12, further comprising:
    a blurring correction unit that corrects the blurring amount of each captured image detected by the blurring detection unit in accordance with a position of blurring relative to positions of faces,
    wherein the image selecting unit selects a captured image whose blurring amount is smaller than a predetermined value based on the blurring amount of each captured image corrected by the blurring correction unit.

14. The image selection device according to claim 12, wherein, when the third image determination unit determines that there are not a plurality of captured images whose blurring amounts are smaller than the predetermined value, the selecting unit selects a captured image with the smallest blurring amount as the captured image to be recorded on a recording medium.

15. The image selection device according to claim 9, further comprising:
    a smoothing unit that smoothes the blink degrees detected by the blink detection unit between adjacent ones of the captured images when an imaging frame rate is not lower than a predetermined value,
    wherein the selecting unit determines the statuses of the human faces in accordance with the blink degrees smoothed by the smoothing unit.

16. The image selection device according to claim 9, wherein the captured images received by the reception unit are sorted based on the estimation by the estimation unit.

17. The image selection device according to claim 9, further comprising:
    a person registration unit that allows a user to register a person,
    wherein, when a face detected by the face detection unit belongs to the person registered in the person registration unit, the estimation unit corrects an estimated value concerned with the face.

18. A method for selecting an image, the method comprising:
    receiving a plurality of captured images obtained by rapid shooting one or more people as subjects;
    performing a face detection process for detecting human faces included in each of the captured images;
    performing an eyes detection process for detecting eyes in each of the human faces detected by the face detection process;
    performing a blink detection process for detecting blink degrees of each of the eyes detected by the eye detection process; and
    selecting at least one captured image which includes eyes having blink degrees higher than the blink degrees of the eyes included in the other captured images from among the received captured images.

19. A non-transitory computer readable medium having stored thereon a program that is executable by a computer to perform image processing for selecting an image, the image processing comprising:
    receiving a plurality of captured images obtained by rapid shooting one or more people as subjects;
    performing a face detection process for detecting human faces included in each of the captured images;
    performing an eyes detection process for detecting eyes in each of the human faces detected by the face detection process;
    performing a blink detection process for detecting blink degrees of each of the eyes detected by the eye detection process; and selecting at least one captured image which includes eyes having blink degrees higher than the blink degrees of the eyes included in the other captured images from among the received captured images.

* * * * *